United States Patent [19]
Thompson

[11] 3,768,839
[45] Oct. 30, 1973

[54] EXPANDABLE CARBURETOR FITTING

[75] Inventor: Vernon F. Thompson, St. Louis, Mo.

[73] Assignee: Tomco, Inc., St. Louis, Mo.

[22] Filed: June 14, 1972

[21] Appl. No.: 262,533

[52] U.S. Cl.............. 285/15, 285/169, 285/334.5, 285/338, 285/351
[51] Int. Cl............................................ F16l 21/02
[58] Field of Search.................. 285/338, 196, 171, 285/162, 346, 15, 351, 169, 334.5; 138/90, 89

[56] References Cited
UNITED STATES PATENTS

| | | | |
|---|---|---|---|
| 2,574,109 | 11/1951 | Kane et al. | 285/338 X |
| 3,058,760 | 10/1962 | Bankowski | 285/338 X |
| 3,499,469 | 3/1970 | Vizuete et al. | 138/90 |
| 2,444,414 | 7/1948 | Anderson et al. | 285/338 X |
| 3,473,555 | 10/1969 | Martin et al. | 138/89 X |
| 1,303,848 | 5/1919 | Broschart | 285/338 |
| 775,124 | 11/1904 | Christman | 285/338 X |
| 402,600 | 5/1889 | Kemp | 138/90 X |

FOREIGN PATENTS OR APPLICATIONS 831,779   6/1938   France................ 285/338

Primary Examiner—Thomas F. Callaghan
Attorney—Philip B. Polster et al.

[57] ABSTRACT

A carburetor fitting is provided having expansive elements which positively lock the fitting within the carburetor fuel inlet and provide a liquid seal against fuel leakage. The fitting is designed specifically to provide a liquid seal deep within the inlet opening, beyond any threads common to such inlets. The preferred embodiment utilizes two O-rings of deformable material which are expanded intentionally once the fitting is positioned within the carburetor fuel inlet passage. The fitting is also designed to permit attachment of a fuel line without the need of hose couplings or other connection means.

4 Claims, 19 Drawing Figures

Patented Oct. 30, 1973

Patented Oct. 30, 1973

EXPANDABLE CARBURETOR FITTING

BACKGROUND OF THE INVENTION

This invention relates to expandable fittings and in particular to a fitting adapted for use in a carburetor fuel inlet. Those skilled in the art, however, will recognize the wide applicability of the concept of my invention to other fitting designs and uses.

It is common in the automotive industry to attach the fuel inlet line for supplying fuel to an automobile engine to a carburetor by an appendage like structure generally constructed along one side of the carburetor housing. This inlet structure has a passage through it which channels the inrushing gasoline to the distribution ports of the carburetor. Conventionally, the structure has an internally threaded portion which is designed and adapted to allow the fuel line to be attached to the carburetor and secured thereto in a liquid sealed relationship. It also is conventional to place a gas line filter in the fuel line contiguous the inlet structure through the use of a carburetor inlet fitting adapted to receive a small filter. This filter is replaced periodically by removing the fuel line and carburetor inlet fitting from the inlet structure. As this replacement is repeated, it is extremely easy to strip the threads of the inlet structure. When these threads wear, it becomes impossible to reconnect the fuel line and carburetor inlet fitting to the inlet structure. Even if reconnection is possible, gasoline leaks often result as the worn threads can no longer supply a liquid seal. At this point, it becomes necessary either to rebore the inlet structure or to utilize some form of special carburetor fitting which prevents the aforementioned leakage. Reboring the inlet structure, and rebuilding the carburetor generally, is accomplished only through considerable expense to the vehicle owner.

A number of special carburetor fitting designs are known in the prior art which are intended to prevent gasoline leakage when the threads of the inlet structure become worn or stripped. The market value of these fittings, of course, is that they permit continued use of the carburetor without subjecting the vehicle owner to the cost entailed in rebuilding part or all of the carburetor. In one such design, a relatively wide band of expansible material is used which is expanded in the inlet opening. While this device works well for its intended purpose, the band of expansible material conventionally is expanded against whatever threads remain in the inlet structure. These thread remnants tend to deteriorate the expansible material over a period of time. After deterioration, leakage again becomes a problem. Consequently, the very remedy provided by the special fitting is subject to failure. Additionally, a hose coupling is utilized in this particular design to connect the fuel line with a male coupling section which extends from the inlet structure after the fitting is positioned properly. This added connection is bothersome to complete, requiring additional time for the maintenance personnel and added cost for the vehicle owner. Additionally, the hose is exposed within the engine compartment of the vehicle where it is subject to the ravages of the environment found there.

My invention eliminates these prior art deficiencies. The fitting of this invention is designed specifically to permit expansion of a first element beyond the threaded portion of the inlet structure. Even long continued use will not cause deterioration. In the preferred embodiment, a second element is spaced from the first element. The second element is expanded along the inlet structure area most likely to be stripped of threads. The double expansion design effectively seals the fitting against any possible leakage between the inner wall of the inlet structure and the outer wall of the fitting. Direct connection between fuel line and fitting is provided, eliminating the need for any additional connection.

One of the objects of this invention is to provide a low cost carburetor fitting.

Another object of this invention is to provide a fitting which effectively seals the inlet structure of a carburetor against leakage.

Yet another object of this invention is to provide a fitting at least a portion of which seals the inlet structure along unthreaded areas of that structure.

Still another object of this invention is to provide a novel expandable fitting.

Other objects of this invention will be apparent to those skilled in the art in light of the following description and accompanying drawings.

SUMMARY OF THE INVENTION

In accordance with this invention, generally stated, an expandable fitting is provided which facilitates carburetor to fuel line connection and which effectively seals the inlet structure of a carburetor against fuel leakage.

In the preferred embodiment, the expandable fitting includes a first and a second portion of deformable material which are compressed intentionally to expand against the inner wall of the fuel inlet structure. An end portion of the fitting external of the fuel inlet structure includes connection means for directly coupling the fuel inlet line to the expandable fitting. It is a particular feature of my invention that each of the embodiments illustrated is designed so as to expand the deformable portions of the fitting against non threaded portions of the inlet structure.

DESCRIPTION OF THE PREFERRED EMBODIMENT

Figure 1:
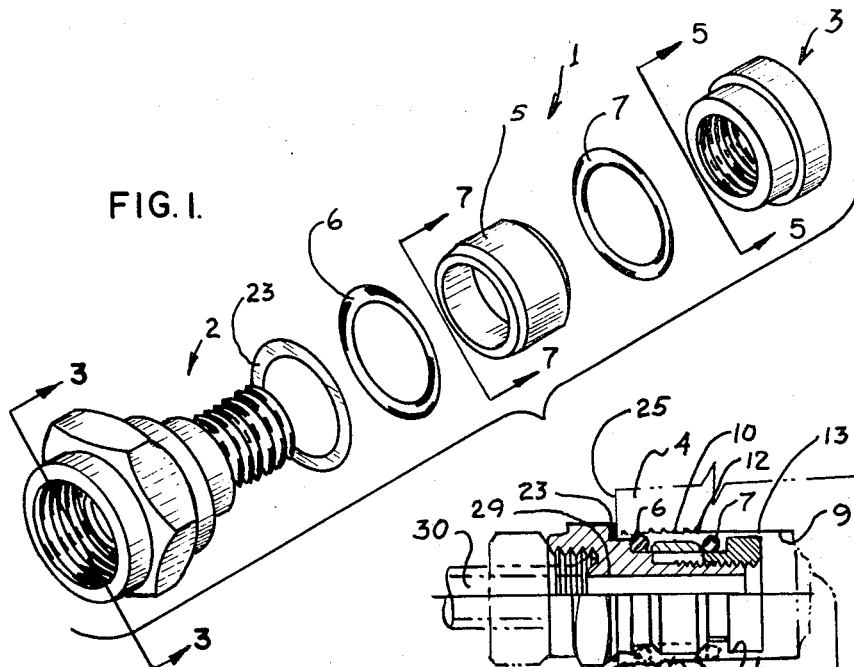
FIG. 1 is an enlarged, exploded view in perspective of one illustrative embodiment of carburetor fitting of this invention.

Referring now to FIG. 1, reference numeral 1 indicates one illustrative embodiment for expandable carburetor fitting of this invention. The embodiment of FIG. 1 includes a male fitting member 2, a female fitting member 3, an expanding means 5, a first resiliently deformable member 6 and a second resiliently deformable member 7.

Figure 2:
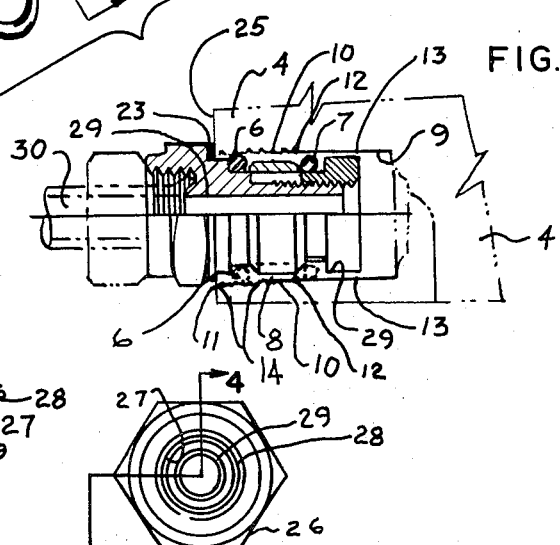
FIG. 2 is a partial sectional view in side elevation showing the carburetor fitting of FIG. 1 installed in a carburetor inlet structure.

Fitting 1 is designed to be inserted in a carburetor inlet structure 4 shown, broken away, in FIG. 2. Structure 4 conventionally is an appendage to a carburetor, not shown. Structure 4 has an opening 8 formed in it, through which incoming fuel may be conveyed to the carburetor. Opening 8 has an inner wall 9. Inner wall 9 has a series of threads 10 formed in it. Initially, the threads 10 run from a mouth 11 of opening 8 to an axial point 12, which may be of any convenient length along the axial length of the opening 8. It is conventional, however, to construct a portion 13 of the inner wall 9 without threads 10. Depicted in FIG. 2 is the common situation where the threads 10 become worn or stripped for a distance 14. The distance 14 extends axially inwardly from the mouth 11 of the opening 8. As previously described, worn threads 10 commonly result during replacement of a small gas line filter, not shown, which necessitates removal of the original carburetor fitting from the carburetor structure 4. This particular situation makes it impossible to secure original equipment fittings to the carburetor inlet structure 4 without leakage of gasoline.

Figures 3, 4:
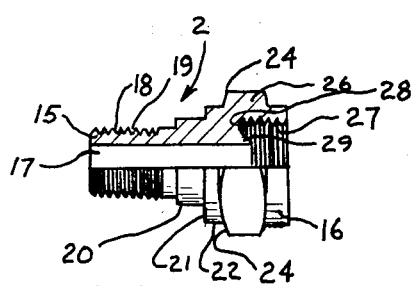
FIG. 3 is a view in end elevation taken along the line 3—3 of FIG. 1.
FIG. 4 is a partial sectional view taken along the line 4—4 of FIG. 3.

Gasoline leakage is prevented, in my invention, through the unique combination of elements shown in FIG. 1, which are illustrated individually in FIGS. 3 through 8. Referring to FIG. 3, it may be observed that male member 2 is an integral structure having a threaded end 15 and a connection end 16. Fitting 2 has an axial opening 17 from and between the ends 15 and 16. The opening 17 is enlarged along the connection end 16, as is explained in detail hereinafter. Member 2 has an outer surface 19 which, as indicated above, has a series of threads 18 in it along the end 15. The threads 18 extend longitudinally along the member 2 for a length sufficient to permit proper positioning of female member 3 as explained in detail hereinafter. This distance may vary with carburetor inlet design.

Outer surface 19 of member 2 also includes an expanded diameter portion which delimits an expansion ridge 20. Expansion ridge 20, as shown in FIG. 2, has resiliently deformable member 6 positioned about it. A wall 21 of ridge 20 is intended to abut deformable member 6. The wall 21 is important in the operation of fitting 1 as later described. Outer surface 19 further defines an external abutment section 22. As is best shown in FIG. 2, section 22 has a vertical wall 24 which is contiguous with an external wall 25 of carburetor structure 4. Section 22 may have a gasket 23 placed about it. While use of gasket 23 normally is not needed because of the design fitting 2, it does provide an insurance measure against leakage. Gasket 23 may be constructed from any of a variety of conventional gasket materials. Surface 19 lastly defines a fastener portion 26 which, in the embodiment illustrated, is formed in the shape of a conventional hexagonal bolt head. Other terminations for the fastener 26 portion are acceptable.

As indicated above, axial opening 17 expands along connection end 16 of male member 2. The end 16 has a threaded inner wall 27 and a bottom wall 28 which is beveled to form an annular connection node 29 about the opening 17. The threaded wall 27 and connection node 29 together provide connection means for a fuel line 30 and permit attachment of the fuel line 30 in a liquid sealed relationship, as is diagrammatically illustrated in FIG. 2.

Figures 5, 6:
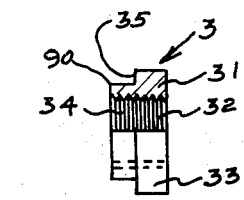
FIG. 5 is a view in end elevation taken along the line 5—5 of FIG. 1.
FIG. 6 is a partial sectional view taken along the line 6—6 of FIG. 5.
Figures 7, 8:
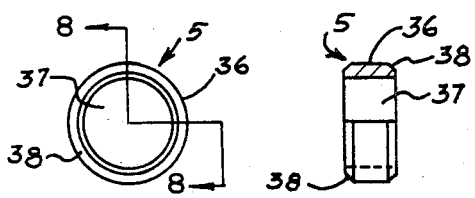
FIG. 7 is a view in end elevation taken along the line 7—7 of FIG. 1.
FIG. 8 is a partial sectional view taken along the line 8—8 of FIG. 7.

Female threaded member 3, shown in FIGS. 5 and 6, is a cylindrical section part 31 having an axial opening 32 through it. Cylindrical section part 31 includes an outer wall 33 and a threade inner wall 34. Outer wall 33 defines a vertical surface 35 and a horizontal surface 90 which delimits a smaller diameter than remaining portion of the cylindrical section 31. Surface 35 is utilized as a deforming surface, as explained in detail hereinafter.

Expanding means 5, in the embodiment illustrated, comprises a tubular part 36 having an axial opening 37 through it. Each end of tubular part 36 has a chamfered edge 38 extending annularly about the opening 37. Chamfered edge 38 is important in the operation of expanding means 5. The edge 38 ensures proper functioning of the expanding means 5 in that edge 38 enables the expanding means 5 to force the deformable members 6 and 7 radially outwardly during the installation of the fitting 1.

First and second resiliently deformable members 6 and 7 may comprise a variety of materials. In the embodiment of FIG. 1, the members 6 and 7 are conventional 0-rings. Other shapes or material combinations are acceptable.

The embodiment of FIG. 1 is simple to use. All components of the fitting 1 are mounted on the male fitting member 2. Thus, if the gasket 23 is used, it is inserted over outer surface 19 of member 2 and seated against the vertical wall 24. Thereafter, first resiliently deformable member 6 is inserted over outer surface 19 until it rests about expanding ridge 20 and abuts wall 21. Expanding means 5 is then inserted over outer surface 19. Opening 37 is sized so as to permit at least the chamfered edge 38 to ride over expanding ridge 20 and abut the first deformable member 6. A second deformable member 7 is placed along surface 35 of female fitting member 3 and the combination is intermounted with male member 2 by the thread combinations 18 and 34. Chamfered edge 38 is sized to enable it to ride over surface 90 so as to abut second deformable member 7. The diameter of the combined parts from vertical wall 24 to the termination of female fitting member 3 is such as to permit fitting 1 insertion into opening 8 of carburetor inlet 4 in a friction fit.

As is best seen in FIG. 2, the axial length of the fitting 1 is designed to permit insertion of fitting member 3 and deformable member 7 into the opening 8 of the carburetor structure 4 so that the deformable member 7 extends beyond the threads 10 contained within the opening 8. This placement is important as it permits sealing of the opening 8 by the fitting 1 along the smooth surface which conventionally exists along the inner wall 9 deep within the opening 8.

Likewise, the deformable member 6 enters the opening 8 along an area where stripping of the threads 10 has occurred. Consequently, it too has a relatively smooth surface on which to perform a sealing function.

Once inserted, the fitting is tightened by rotating fastener portion 26, thereby drawing the fitting member 2 into the fitting member 3. Tightening, as indicated above, is facilitated because of the self threading nature of the combination. As the members 2 and 3 are tightened together, the expanding means 5, and in particular, the edges 38 of that part force the first and second deformable members 6 and 7 radially outwardly. The deformable member 7 is expanded against surface 35 and inner wall 9 while the deformable member 6 is expanded against wall 21 of ridge 20 and inner wall 9. This expansion effectively seals the opening 8 against later fuel leakage. Thereafter, fuel line 30 may be inserted and attached to the fitting along the threads of wall 27 and the connection node 29.

Removal of the fitting 1 is just a reversal of the above described process. This is, the fuel line 30 is removed from its engagement with the threads of wall 27, and fastener portion 26 is loosened. This draws the male member 2 from the female member 3, allowing the resiliently deformable members 6 and 7 to assume their original shape. Thereafter, the fitting 1 may be extracted from the opening 8.

Figure 9:
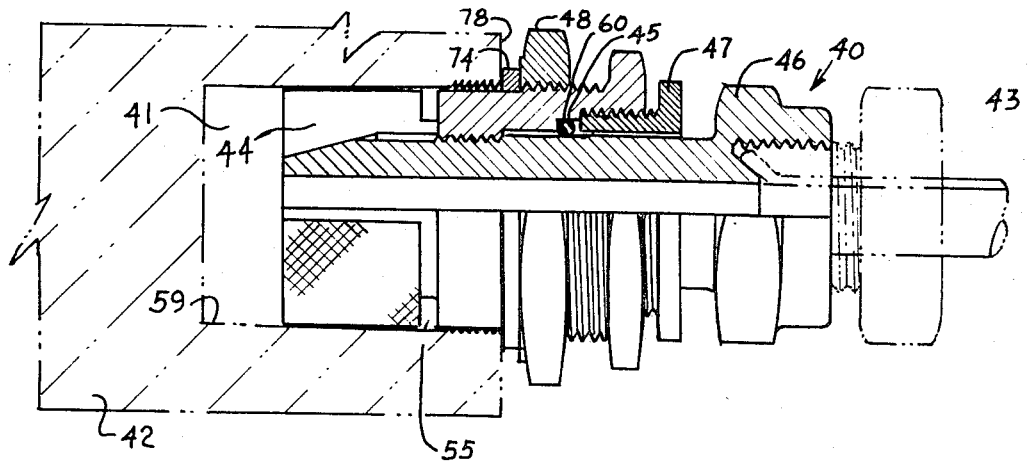
FIG. 9 is an enlarged, partial sectional view of a second illustrative embodiment of carburetor fitting of this invention shown installed in a carburetor fuel inlet structure.

A second illustrative embodiment of fitting of this invention is indicated generally by the reference numeral 40 and is illustrated in FIG. 9. As there shown, fitting 40 is intended to be inserted in an opening 41 of a carburetor inlet structure 42. As in the embodiment of FIG. 1, the fitting 40 connects a fuel inlet line 43 with the carburetor structure 42.

In this particular embodiment, the fitting 40 includes an expandable female fitting member 44, a resiliently deformable member 45, a male fitting member 46, a compression nut 47 and a lock nut 48.

Figure 10:
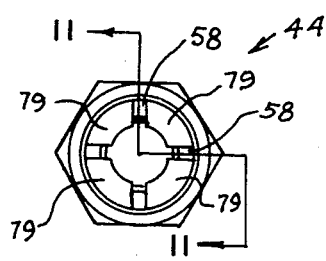
FIG. 10 is a view in end elevation of a female fitting member illustrated in FIG. 9.
Figure 11:
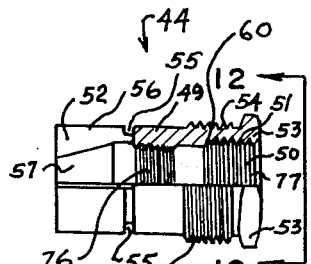
FIG. 11 is a partial sectional view taken along the line 11—11 of FIG. 10.
Figure 12:
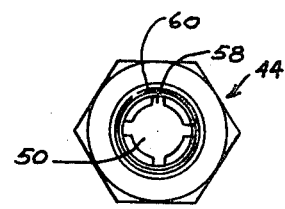
FIG. 12 is a view in end elevation taken along the line 12—12 of FIG. 11.

Expandable female fitting member 44 is illustrated in FIGS. 10 through 12. As there shown, the member 44 is a generally cylindrical section 49 having an axial opening 50 through it. Section 49 has a self threading end 51 and an expansion end 52. The opening 50 extends through the section 49 between the ends 51 and 52. A portion of the opening 50 delimits a threaded section 76. The function of section 76 is described in the operational description of the fitting of this embodiment disclosed hereinafter.

Self threading end 51 includes an annular shoulder 53 about opening 50. Fitting member 44 has a threaded outer wall 54 and a threaded inner wall 77. Operation of the self threading end 51 is similar to that described for the female fitting 3 of the previous embodiment and is well known in the art. As indicated, outer wall 54 has a plurality of threads 78 which extend along the wall 54 from shoulder 53 for a predetermined distance. That distance depends on the particular carburetor structure 42 under consideration and the insertion depth required by that structure.

Expansion end 52 is intergral with and joined to the self threading end 51 of fitting member 44 along an annular channel 55. The channel 55 permits flexing of expansion end 52 as is described in detail hereinafter. Expansion end 52 includes an outer surface 56 and an inner surface 57. The outer surface 56 has a plurality of slots 58 cut through it, which divide the end 52 into the plurality of preshaped sections indicated generally by the numeral 79. The slots 58 define self threading means for expansion end 52. That is, the slots 58 enable fitting member 44 to rebore the opening 41 in carburetor inlet structure 42. Consequently, the fitting 40 may be inserted within the opening 41 regardless of the condition of the threads contained along inner wall 59 of opening 41, as the notches 58 permit the member 44 to rethread the wall 59. Inner surface 57 narrows as the opening 50 extends from end 51 toward end 52 and in particular as the opening extends from channel 55 toward end 52, as is best shown in FIG. 11. The diameter of opening 50 also is enlarged along self threading end 51. An annular shoulder 60 is defined at the point of the opening 50 enlargement. Shoulder 60 is important and its function is discussed hereinafter.

Figure 13:
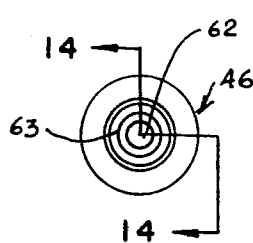
FIG. 13 is a view in end elevation of a male fitting member illustrated in FIG. 9.
Figure 14:
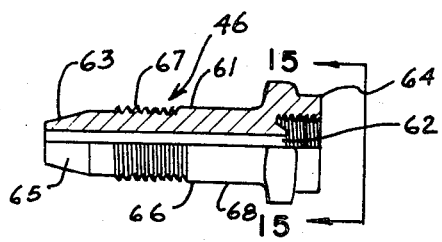
FIG. 14 is a partial sectional view taken along the line 14—14 of FIG. 13.
Figure 15:
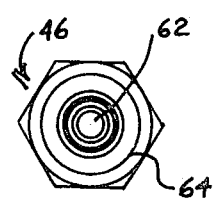
FIG. 15 is a view in end elevation taken along the line 15—15 of FIG. 14.

Male fitting member 46 is illustrated with particularity in FIGS. 13 through 15. Fitting 46 is a cylindrical part 61 having an axial opening 62 from and between a first end 63 and a second end 64. End 64 corresponds to connection end 16 of fitting member 2 and is not described in detail. That is, the end 64 and the end 16 are identical in construction and function in each embodiment. End 63 has a tapered portion 65 and an axial portion 66 extending from the tapered portion 65 to end 64. Axial portion 66 includes a threaded section 67 and a smooth section 68.

Figure 16:
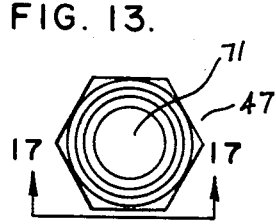
FIG. 16 is a view in end elevation of a compression nut utilized in the embodiment of FIG. 9.
Figure 17:
FIG. 17 is a plan view taken along the line 17—17 of FIG. 16.

Compression nut 47, illustrated in FIGS. 16 and 17, has an axial portion 69 and an annular, hexagonal shoulder portion 70 forming one end thereof. The second end of compression nut 47 comprises the termination of portion 69. Compression nut 47 has an opening 71 through it. The axial portion 69 has a threaded outer surface 80 along its entire length.

Figure 18:
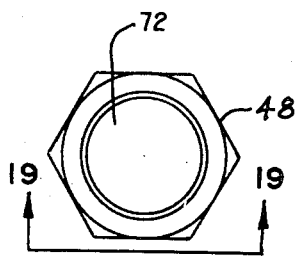
FIG. 18 is a view in end elevation of a lock nut utilized in conjunction with the embodiment of FIG. 9.
Figure 19:
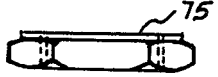
FIG. 19 is a plan view taken along the line 19—19 of FIG. 18.

Lock nut 48 shown in FIGS. 18 and 19 is conventional generally being hexagonal in shape with a threaded opening 72 through it.

As in the previous embodiment, fitting 40 is simple to use. All components of the fitting 40 are mounted on the male fitting member 46. Compression nut 47 is placed over cylindrical part 61 of male member 46. Likewise, deformable member 45, similar to the deformable members of the previous embodiment, is placed over cylindrical part 61 until it abuts an edge 73 of compression nut 47.

Lock nut 48 is mounted over expandable female fitting 44 and these parts are engaged along the threaded opening 72 of lock nut 48 and the threads 78 of the outer wall 54. A gasket 74 also may be inserted over fitting member 44 until it abuts an edge 75 of lock nut 48. The gasket 74 is an insurance measure against leakage which may be utilized if desired. Thereafter, end 63 of fitting 46 is inserted within fitting 44. As those parts are intermounted, tapered portion 65 abuts inner surface 57. As intermounting continues, threaded section 67 is engaged in the threaded section 76 within the opening 50. Sections 67 and 76 are of a self threading nature. Once sections 67 and 76 are engaged the fitting 40 is inserted within the opening 41. After positioning, member 46 is tightened and the tapered portion 65 of member 46 expands end 52 of member 44, forcing the end 52 radially outwardly along the relatively flexible area about the channel 55. It may be observed, in FIG. 9, that the expansion of end 52 occurs beyond the threaded portion of opening 50. This expansion seals the opening 41 against liquid leaks.

As intermounting continues, compression nut 46 is engaged with threads 77 of opening 41. Tightening the compression nut 46 forces deformable member 45 into abutment with the shoulder 60 of fitting member 44. Member 45 is expanded and compressed tightly against shoulder 60 and cylindrical portion 61 of male fitting member 46 by this process. Likewise, tightening of the lock nut 48 forces gasket 74 against an edge 78 of the carburetor structure 42. Once positioned, fitting 50 effectively seals opening 41 against any possible leakage and the fuel inlet 43 may be connected to male fitting member 46 as in the previous embodiment.

Numerous variations, within the scope of the appended claims, will occur to those skilled in the art in light of the foregoing description and accompanying drawings. For example, while the deformable members were described as O-rings, their shape or material composition may vary. Likewise, the expanding end 52 of fitting 44 may comprise a variety of materials. For example, that end may comprise a resilient material, in the conventional sense of that word, or it may be metal. Although I prefer the use of hexagonal bolt heads for the surfaces which are tightened in the embodiments of my invention, other forms and shapes are acceptable. While the embodiment of FIG. 9 includes a re-boring feature, other embodiments in my invention may eliminate the slots 58. These variations are merely illustrative.

Having thus described the invention, what is claimed and desired to be secured by Letters Patent is:

1. In a carburetor having a fuel inlet, said inlet having a mouth, a threaded part extending axially inwardly from said mouth, and a nonthreaded part inboard of and adjacent said threaded part, the improvement which comprises an expandable fitting having at least two, axially spaced resiliently deformable members, one of said members being positioned for expansion along said nonthreaded part and the other of said deformable members being positioned for expansion along said threaded part, said expandable fitting comprising a male part having an axial opening therethrough, said male part including a threaded shank insertable in said inlet, an enlarged head portion having an outer diameter greater than the internal diameter of said inlet, positioned outboardly of said mouth in the inserted position of said shank and a ridge portion insertable in said inlet, said ridge portion being defined by an axial wall and a radial wall extending outwardly from said axial wall, said ridge portion being integrally formed with and positioned between said head portion and said shank; a female part having an axial opening therethrough for intermounting with said shank, said female part having an outer wall defining an axial surface and a radial surface extending outwardly from said axial surface; and expanding means having a body, said body having an axial opening through it, said opening being sized to permit simultaneous intermounting with said ridge portion and said axial surface as said female part is threadedly intermounted with said shank, each of said resiliently deformable members defining an annulus, one of said annuli being mounted on said ridge portion, abutting said radial wall on a first side of said annulus and abutting said expanding means on the second side of said annulus, the other of said annuli being mounted on said female part, abutting said radial surface on a first side of said annulus and abutting said expanding means on a second side of said annulus, each of said annuli being forced radially outwardly between respective ones of said radial wall, said radial surface and said expanding means as said female part is intermounted on said shank.

2. The improvement of claim 1 wherein each of said annuli are O-rings, the outer diameters of each of said O-rings in their non-deformed state being less than the respective outer diameters of said radial wall and said radial surface of said male and female parts, the outer diameters of each of said O-rings being greater than the respective outer diameters of said radial wall and said radial surface when said shank is intermounted with said female part.

3. The improvement of claim 1 wherein said axial opening in said male part is expanded along said head portion to form a connection end for said male part, said connection end having a threaded inner wall and a bottom wall closing one side of said connection end, except along said axial opening in said shank, said bottom wall having an annular connection node about the entrance of said axial opening in said shank.

4. An expandable carburetor fitting for a carburetor having a fuel inlet, said inlet having a mouth defined by a wall, said wall having a threaded part and a nonthreaded part extending sequentially inwardly from said mouth, comprising:
   a male fitting having an axial opening therethrough including a threaded shank, an enlarged head portion, and a ridge portion having an axial surface and a radial wall perpendicular to and extending outwardly from said axial surface, said ridge portion being positioned between and integrally formed with said head portion and said shank;
   a threaded female fitting having an axial opening in it, for intermounting with said shank, said female fitting having an outer wall defining an axial surface and a radial surface, said radial surface being perpendicular to said axial surface;
   expanding means including a body part having an axial opening therethrough, said body part having a chamfered edge about said axial opening, on each end of said body, said expanding means being intermountable with each of said axial wall and said axial surface as said shank is inserted into said female fitting;
   a first resiliently deformable annulus intermounted on said ridge portion, abutting said radial wall; and
   a second resiliently deformable annulus mounted on said female fitting, abutting said radial surface, the radial dimension of said carburetor fitting being such that said second annulus is positioned along the nonthreaded portion of said inlet while said first annulus is positioned along said threaded portion of said inlet when said fitting is inserted in said fuel inlet, said first and said second annuli being expanded radially outwardly between the chamfered edge of said expanding means and said radial wall and said radial surface respectively, as said male fitting is inserted in said female fitting.

* * * * *